(12) United States Patent
Venkatsubra

(10) Patent No.: US 7,742,454 B2
(45) Date of Patent: Jun. 22, 2010

(54) NETWORK PERFORMANCE BY DYNAMICALLY SETTING A REASSEMBLY TIMER BASED ON NETWORK INTERFACE

(75) Inventor: Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 829 days.

(21) Appl. No.: 11/014,054

(22) Filed: Dec. 16, 2004

(65) Prior Publication Data
US 2006/0133364 A1 Jun. 22, 2006

(51) Int. Cl.
*H04W 4/00* (2009.01)
*H04J 3/24* (2006.01)
(52) U.S. Cl. ................ 370/338; 370/473; 370/474
(58) Field of Classification Search ............ None
See application file for complete search history.

(56) References Cited

U.S. PATENT DOCUMENTS

| | | | | |
|---|---|---|---|---|
| 5,978,355 | A * | 11/1999 | Yamaguchi | 370/395.7 |
| 6,810,042 | B1 * | 10/2004 | Naumann et al. | 370/412 |
| 6,894,976 | B1 * | 5/2005 | Banga et al. | 370/235 |
| 6,961,349 | B2 * | 11/2005 | Malomsoky et al. | 370/469 |
| 6,982,991 | B1 * | 1/2006 | Atoji | 370/474 |
| 7,061,914 | B2 * | 6/2006 | Mankins | 370/394 |
| 7,236,461 | B1 * | 6/2007 | Sonti et al. | 370/252 |
| 2001/0048681 | A1 * | 12/2001 | Bilic et al. | 370/389 |

OTHER PUBLICATIONS

Delp, et al., Better Receive Buffer Utilization Using Internet Protocol Fragmentation, Publication Name TDB v38 n11, Nov. 1995, pp. 369-370, Rochester MN.

* cited by examiner

*Primary Examiner*—Melanie Jagannathan
(74) *Attorney, Agent, or Firm*—Dillon & Yudell LLP

(57) ABSTRACT

The reassembly timer in a TCP/IP receiver is dynamically set to avoid data corruption on fast networks caused by IP identification wrap-around. A receiver independently sets the reassembly timer to a first reassembly time set by the user for fast networks or to a second reassembly timer set by the user for slow networks based on whether the receiver and sender are on the same subnet.

18 Claims, 6 Drawing Sheets

NETWORK PERFORMANCE BY DYNAMICALLY SETTING A REASSEMBLY TIMER BASED ON NETWORK INTERFACE

BACKGROUND OF THE INVENTION

1. Field of the Invention

The present invention relates generally to data transfers in data processing network systems, and in particular to transfer of data blocks over the Internet and similar networks. Still more particularly, the present invention relates to improved Internet Protocol (IP) network communications.

2. Description of the Related Art

A computer network is a geographically distributed collection of interconnected communication media for transporting data between entities. An entity may consist of any device, such as a host or end station, that sources (i.e., transmits) and/or receives network messages over the communication media. Many types of computer networks are available, with the types ranging from local area networks (LANs) to wide area networks (WANs). The end stations, which may include personal computers or workstations, typically communicate by exchanging discrete messages, such as frames or packets, of data according to predefined protocols. In this context, a communications protocol stack consists of a set of rules defining how the stations interact with each.

The Internet has become an important computer network for transmission and distribution of data (text, code, image, video, audio, or mixed) and software. The primary protocols of the Internet communications architecture protocol stack are the Internet Protocol (IP) at the network layer (layer 3) and Transmission Control Protocol (TCP) at the transport layer (layer 4). The term TCP/IP is commonly used to refer to the Internet architecture, which has become a widely implemented standard communication protocol in Internet and Intranet technology, enabling broad heterogeneity between clients, servers, and the communications systems coupling them. IP provides a "datagram" delivery service at the network level. TCP builds a connection-oriented transport level service to provide reliable, sequential delivery of a data stream between two IP hosts. Reliability in TCP/IP transmissions is generally compromised by three events: data loss, data corruption, and reordering of data.

Data loss is managed in TCP/IP by a time-out mechanism. TCP maintains a timer (retransmission timer) to measure the delay in receiving an acknowledgment (ACK) of a transmitted segment from the receiver. When an ACK does not arrive within an estimated time interval (retransmission time-out (RTO)), the corresponding segment is assumed to be lost and is retransmitted. Further, because TCP is traditionally based on the premise that packet loss is an indication of network congestion, TCP will back-off its transmission rate by entering "slow-start," thereby drastically decreasing its congestion window to one segment.

TCP manages data corruption by performing a checksum on segments as they arrive at the receiver. The checksum algorithm is a 16-bit one's complement of a one's complement sum of all 16-bit words in the TCP header and data. The TCP sender computes the checksum on the packet data and loads this 2-byte value into the TCP header. The TCP header's checksum field also includes a 12-byte pseudo header that contains information from the IP header. The receiver computes the checksum on the received data (excluding the 2-byte checksum field in the TCP header), and verifies that it matches the checksum value in the header.

TCP manages reordering of data or out-of-order arrival of segments by maintaining a reassembly queue that queues incoming packets until they are rearranged in sequence. Only when data in this queue gets in sequence is it moved to the user's receive buffer where it can be seen by the user. When the receiver observes a "hole" in the sequence numbers of packets received, it generates a duplicate acknowledgement (DACK) for every subsequent "out-of-order" packet it receives. Until the missing packet is received, each received data packet with a higher sequence number is considered to be "out-of-order" and will cause a DACK to be generated.

FIG. 7 is a schematic block diagram of an IP packet 100 comprising an IP header portion 110 and a payload/data portion 150. The IP header 110 comprises a version field 102 that indicates the format of the IP header, an Internet header length (IHL) field 104 that indicates the length of the Internet header and a type of service (TOS) field 106 that provides an indication of parameters of a desired quality of service. An IP total length field 108 specifies the length of the IP packet including the IP header and payload/data, while an IP identification field 110 specifies an identifying value assigned by the sending entity to aid in assembling the fragments of the packet.

The IP header further includes a more fragment (MF) flag 112, an IP fragment offset field 114 that specifies the placement of the fragment within the IP packet and a time to live (TTL) field 116 that indicates a maximum time the packet is allowed to remain in the network. A protocol field 118 indicates the next level protocol used in the payload/data portion 150 of the packet, while a header checksum field 120 provides a checksum on only the IP header. The IP header further includes a source address field 122 containing the IP source address of the sending entity and a destination address field 124 containing the IP destination address of the receiving entity, along with an options field 126 and a padding field 128.

Fragmentation of an IP datagram (hereinafter referred to as a packet) is often necessary if the LAN standards associated with the source and destination entities are dissimilar (e.g., Ethernet and Token Ring). In such a case, the routers and switches of the network may need to alter the format of the packet so that it may be received by the destination entity. For example, if a packet originates in a network that allows a large packet size and traverses one or more links or local networks that limit the packet to a smaller size, the switch interconnecting the networks must fragment the IP packet. In the context of a TCP/IP networking environment, the fragmentation and reassembly procedure is well known and described in detail in the Internet Protocol, Request for Comments (RFC) 791, by Information Sciences Institute University of Southern California (1981), which disclosure is hereby incorporated by reference. According to RFC 791, IP fragmentation apportions an IP packet into an arbitrary number of fragments that can be later reassembled.

To fragment an IP packet, either a source or an intermediate system (e.g., a switch) creates two or more new IP fragments and copies the contents of a portion of the IP header fields from the original packet into each of the IP headers of the fragments. The receiving entity of the fragments uses the contents of the IP identification field 110 (i.e., the packet identifier (ID)) to ensure that fragments of different packets are not mixed. That is, the identification field 110 is used to distinguish the fragments of one packet from those of another. The IP fragment offset field 114 informs the receiving entity about the position of a fragment in the original packet. The contents of the fragment offset field and the IP total length field 108 of each fragment determine the portion of the original packet covered by the fragment. The MF flag 112 indicates (e.g., when reset) the last fragment. The originating host of a complete IP packet sets the IP identification field 110 to a value that is unique for the source/destination address pair and protocol (e.g., TCP, UDP) for the time the packet will be active in the network. The originating host of the complete packet also sets the MF flag 112 to, e.g., zero and the IP fragment offset field 114 to zero.

The IP identification field 110 is a 2 byte field, which must wrap around (i.e., must restart numbering at 1) after reaching 65535. On a high speed network generating thousands of IP packets per second, the IP identifier (IP-ID) in field 110 can wrap around multiple times per second. For example, on gigabit Ethernet, 80,000 packets can be generated in a second, which means the wrap around of the IP-ID can occur within a second. As networks become even faster, this wrap around occurs even more frequently. For example, with 10 gigabit Ethernet, the wrap around can occur in milliseconds.

As a result, IP-ID wrap-around can be a cause of data corruption in the network if fragments belonging to a wrapped around IP-ID are reassembled with fragments of a different IP packet identified by the original IP-ID. Upper layer protocols such as TCP or UDP may not be able to detect the corruption since the Internet checksum algorithm utilizing header checksum 120 to detect corruption is not very strong. This problem is addressed in IP by the use of a reassembly timer (see RFC 791). IP fragment reassembly uses the reassembly timer to discard fragments if all fragments of an identified packet have not been received within the reassembly timer period. Many implementations of IP fragment reassembly typically use 30 seconds for the reassembly timer. In vary fast networks, the IP-ID will wrap around many times in this time interval, increasing the likelihood that fragments will be mismatched with the wrong fragments of a wrapped around IP-ID.

The solution to IP-ID wrap around in fast networks has been to set the reassembly timer to a very low value, thereby reducing the number of duplicate IP-IDs outstanding. However, this causes performance degradation in network environments with varied speeds of both fast and slow networks because fragments will be mistakenly discarded along a slow link when the IP packets merely have not yet arrived. Discarding IP fragments in slow network connections will result in unnecessary retransmissions being required from the upper layers. As can be seen, it would be desirable to provide a solution to data corruption problems caused by IP-ID wrap-around on variable-speed networks that provides improved performance over the known solutions.

SUMMARY OF THE INVENTION

In accordance with the present invention, improved methods, systems and articles of manufacture for communication over a data processing system network are disclosed. One preferred method of the present invention comprises the steps of receiving a data fragment over a network at the receiver, dynamically setting a reassembly time for the data fragment as a function of the interface to a sender of a data packet comprising the data fragment, and discarding the data fragment if it remains fragmented from the data packet longer than the reassembly time following receipt of the data fragment.

All objects, features, and advantages of the present invention will become apparent in the following detailed written description.

BRIEF DESCRIPTION OF THE DRAWINGS

This invention is described in a preferred embodiment in the following description with reference to the drawings, in which like numbers represent the same or similar elements, as follows.

In the following detailed description of exemplary embodiments of the invention, reference is made to the accompanying drawings, which form a part hereof, and in which is shown by way of illustration specific exemplary embodiments in which the invention may be practiced.

DETAILED DESCRIPTION OF PREFERRED EMBODIMENTS

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims. In particular, although the preferred embodiment is described below with respect to a TCP/IP network environment, it will be appreciated that the present invention is not limited to TCP/IP implementations.

Figure 1:
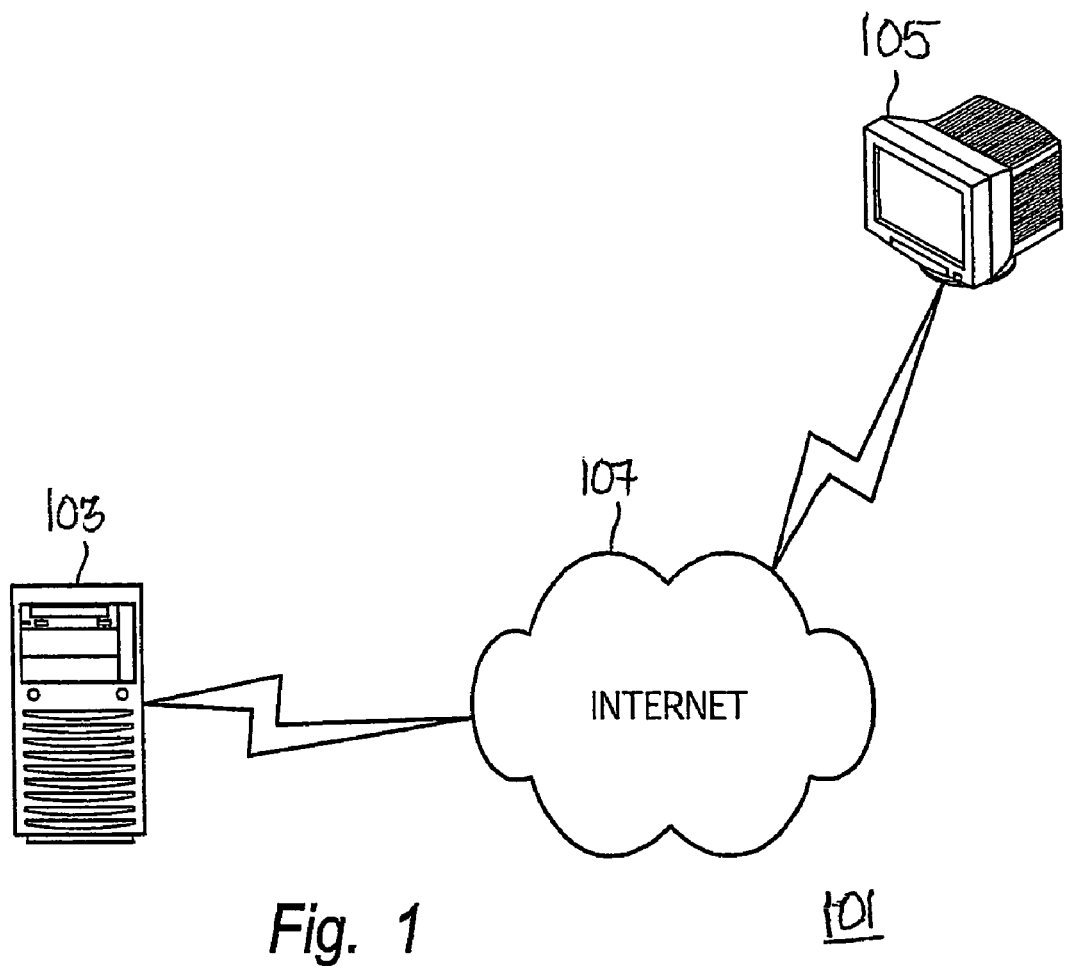
FIG. 1 shows a data processing system network in which a preferred embodiment of the present invention may be implemented is depicted.

With reference now to the figures, and in particular with reference to FIG. 1, a data processing system network in which a preferred embodiment of the present invention may be implemented is depicted. Data processing system network 101 includes at least one server system 103 coupled to at least one client system 105 via at least one network such as the Internet 107. Data transfers between the server 103 and client 105 conform to the TCP/IP specification, as well as File Transfer Protocol (FTP), HyperText Transfer Protocol (HTTP), or some similar communications protocol. As will be appreciated, while only a single server 103 and single client system 105 are shown, data processing system network 101 may include any number of server and client systems (not shown) interconnected by one or more connections and networks, including Internet 107. For illustrative purposes, server 103 and client system 105 communicate using TCP/IP, although the present invention is not limited as such, and that, in alternative embodiments, other suitable protocols may also be employed.

Figure 2:
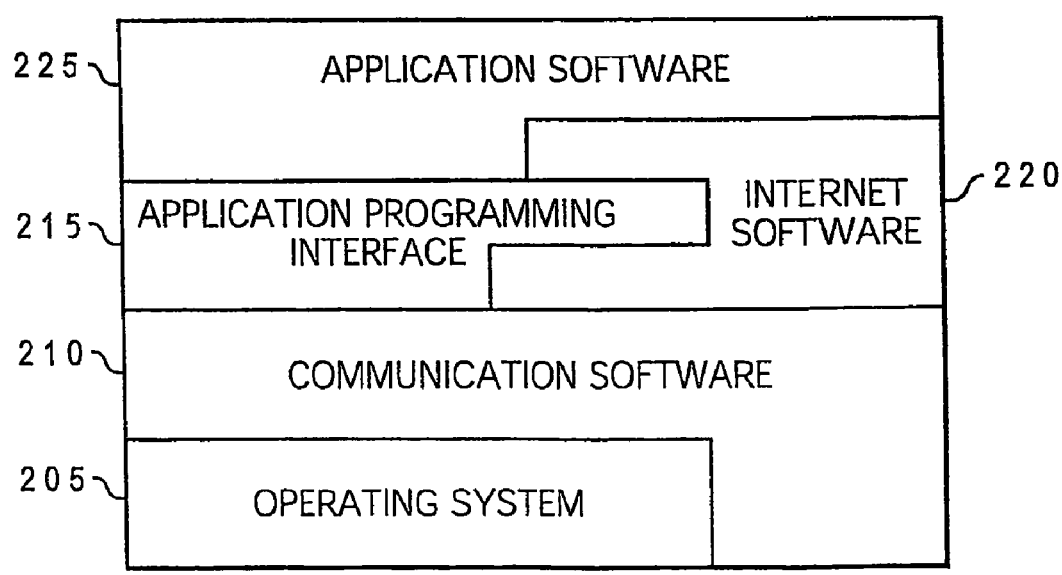
FIG. 2 is a depiction of a typical software architecture for a server-client system, as may be utilized in a preferred embodiment of the present invention.

FIG. 2 is a depiction of a typical software architecture for a server-client system, as may be utilized in a preferred embodiment of the present invention. Server 103 and client 105 are each architected with software architecture 200. At the lowest level, an operating system 205 is utilized to provide high-level functionality to the user and to other software. Such an operating system typically includes a BIOS (Basic Input Output System). Communication software 210 provides communications through an external port to a network such as the Internet via a physical communication link by either directly invoking operating system functionality or indirectly, bypassing the operating system to access the hardware for communications over the network. The application programming interface 215 allows the user of the system, be it an individual or a software routine, to invoke system capabilities using a standard consistent interface without concern for how the particular functionality is implemented. The Internet software 220 represents any one of several standard commercial packages available for equipping a computer with Internet functionality. The application software 225 represents any number of software applications designed to react to data through the communications port to provide the desired functionality the user seeks. Applications at this level may include those necessary to handle data, video, graphics, photos or text, which can be accessed by users of the Internet.

Figure 3:
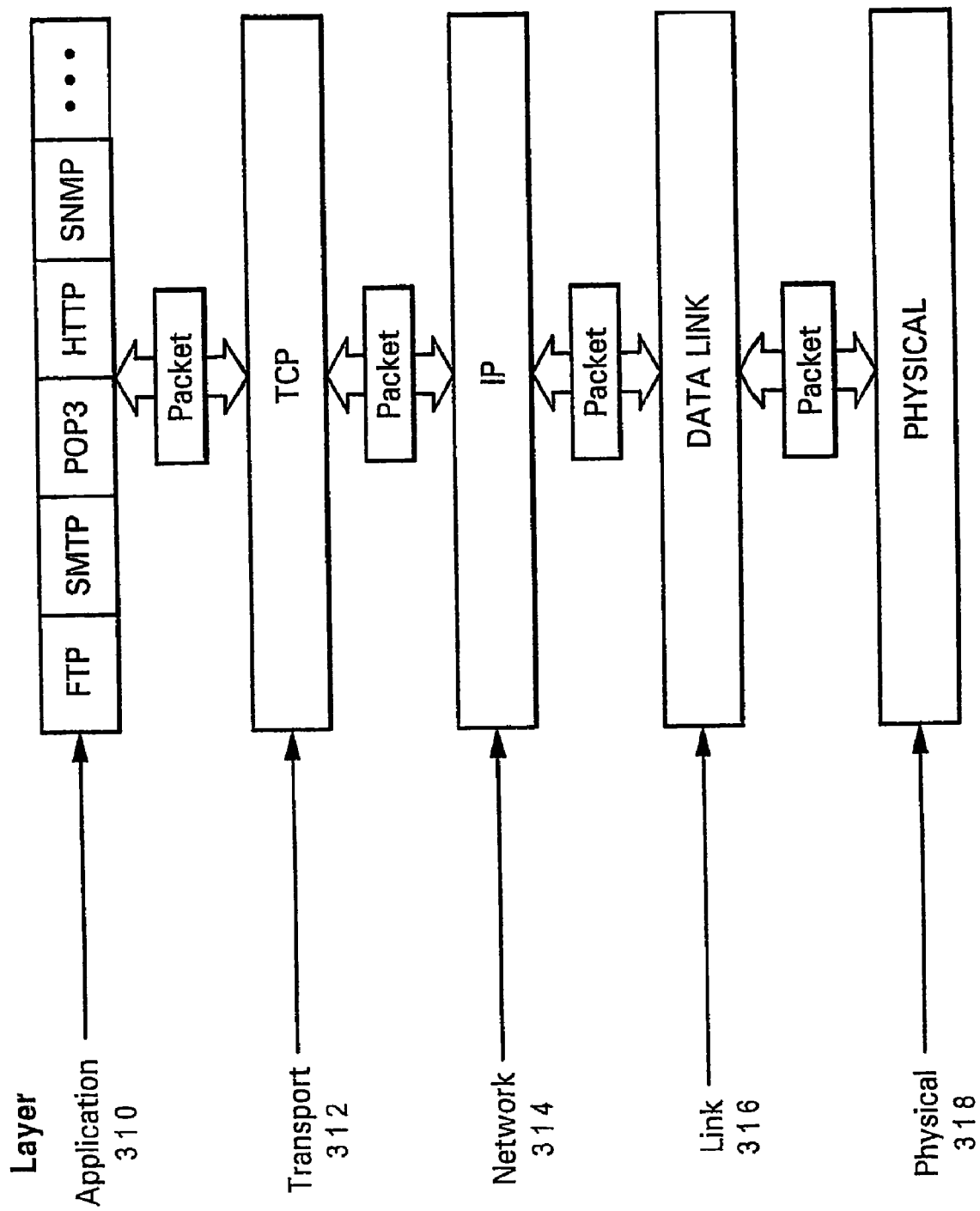
FIG. 3 is a 4-layer communications architecture for the network, as may be utilized in a preferred embodiment of the present invention.

As shown in FIG. 3, TCP/IP and similar protocols are utilized by a 4-layer communications architecture for the network comprising an application layer 310, a transport layer 312, a network layer 314, a link layer 316 and a physical layer 318. Each layer is responsible for handling various communications tasks, as follows.

Physical layer 318 generally transforms data into bits for communication between the various physical devices in the network. Examples of protocols employed in the physical layer may include, but are not limited to, protocols from the network interface card, such as an Ethernet card, token ring card, wireless network card, and the like. The Institute Of Electrical and Electronics Engineers (IEEE) has promulgated a variety of protocols that may be employed in the physical layer, protocols such as IEEE 802.3 Standard (Ethernet), IEEE 802.5 Standard (Token Ring), and IEEE 802.11 Standard (Wireless Ethernet).

Link layer 316 generally manages the data that is communicated over the network. Link layer 316 (also referred to as the data-link layer or the network interface layer) normally includes the device drivers and may include protocols such as Media Access Control (MAC), for example. Together, the physical and link layers handle all the hardware details of physically interfacing with the network media being used.

The network layer 314 (also referred to as the internet layer) handles the movement of packets of data around the network. For example, the network layer handles the routing of the various packets of data that are transferred over the network. The network layer in the TCP/IP suite is comprised of several protocols, including IP (Internet Protocol), ICMP (Internet Control Message Protocol), and IGMP (Internet Group Management Protocol).

The transport layer 312 provides an interface between the network layer 314 and the application layer 310 that facilitates the transfer of data between two host computers. The transport layer is concerned with things such as dividing the data passed to it from the application into appropriately sized chunks for the network layer below, acknowledging received packets, setting timeouts to make certain the other end acknowledges packets that are sent, etc. In the TCP/IP protocol suite there are two distinctly different transport protocols: TCP (Transmission Control Protocol) and UDP (User Datagram Protocol). TCP provides reliability services to ensure that data is properly transmitted between two hosts, including dropout detection and retransmission services. Conversely, UDP provides a much simpler service to the application layer by merely sending packets of data called datagrams from one host to the other, without providing any mechanism for guaranteeing that the data is properly transferred. When using UDP, the application layer must perform the reliability functionality.

The application layer 310 handles the details of the particular application. There are many common TCP/IP applications that almost every implementation provides, including (1) Telnet for remote login; (2) FTP, the File Transfer Protocol; (3) SMTP, the Simple Mail Transfer Protocol, for electronic mail, (4) SNMP, the Simple Network Management Protocol, and (5) Post Office Protocol, v3 (POP3).

Figure 4:
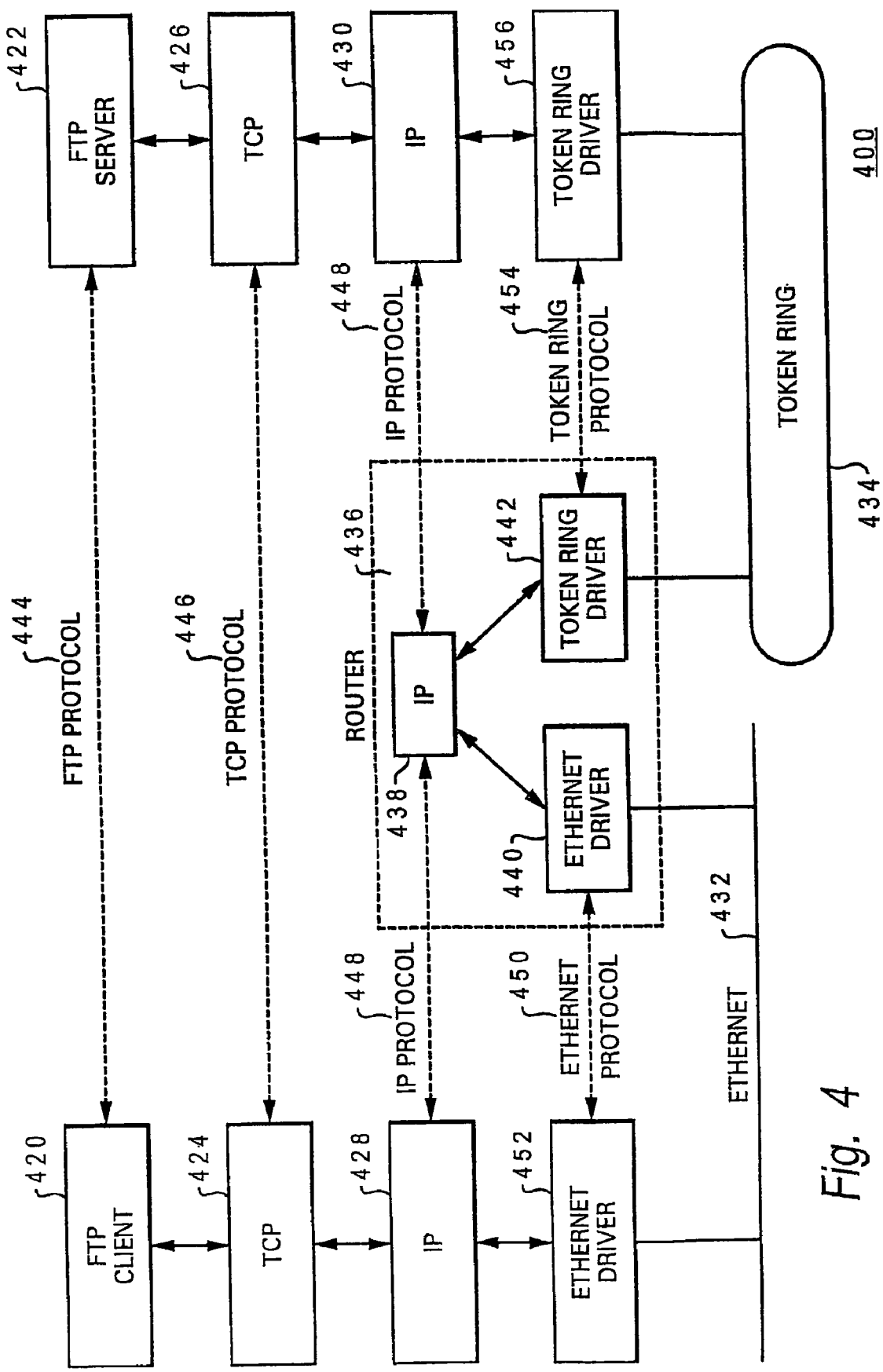
FIG. 4 depicts a block diagram of networks such as the Internet interconnected by routers, as may be utilized in a preferred embodiment of the present invention.

Networks such as the Internet are interconnected by routers, which each connecting two or more networks together. Typical routers comprise a special-purpose hardware box with input and output connections and dedicated hardware and/or embedded software that allow many different types of physical networks to be connected, such as Ethernet, token ring, point-to-point links, etc. FIG. 4 shows an internet 400 comprising an Ethernet network 432 connected to a token ring network 434 by a router 436. Although FIG. 4 only shows two hosts in communication, any host on the Ethernet network can communicate with any host thereon, or with any host on the token ring network, and vice versa.

As shown in FIG. 4, the router 436 comprises a network layer module 438 (an IP module in this case), and appropriate network drivers for connecting to the host networks, namely an Ethernet driver 440 and a token ring driver 442. At the application layer, the network comprises an FTP client 420 and a FTP server 422; at the transport layer, the network comprises a TCP client 424 and a TCP server 426; and at the network layer, the network comprises an IP client 428 and a IP server 430. Most network applications are designed so that one end is the client and the other side is the server. The server provides some type of services to various clients, in this case, access to files on the server host. Each layer has one or more protocols for communicating with its peer at the same layer. These communication protocols include the FTP protocol 444 at the application layer, the TCP protocol 446 at the transport layer, the IP protocol 448 at the network layer, and the Ethernet protocol 450 and token ring protocol 454 at the link layer. It is common for the application layer to handle user processes, while the lower three layers (transport, network and link) are implemented in the kernel of the operating system, such as UNIX or Windows operating system. For example, the purpose of the network interface layer is to handle the details of the communication media (Ethernet, token ring, etc.), while the purpose of the application layer is to handle one specific user application (FTP, Telnet, etc.).

The application layer and the transport layer use end-to-end protocols (FTP protocol 444, TCP protocol 446). The network layer provides a hop-to-hop protocol that is used on the two end systems and every intermediate system in between (for clarity only one intermediate system is shown here). For instance, the IP module 438 of the router 436 is connected to the two hosts by IP protocols 448. There are also link layer protocols that are specific to the various types of host networks that are connected to the router to handle communication between the networks and the router at the link layer. Thus, an Ethernet protocol 450 is used to handle communications between the Ethernet driver 440 in the router 436 and the Ethernet driver 452 of the hosts on the Ethernet network 432, while a token ring protocol 454 is used to handle communications between the token ring driver 442 of the router 436 and the token ring driver 456 of the hosts on the token ring network 434.

Figure 5:
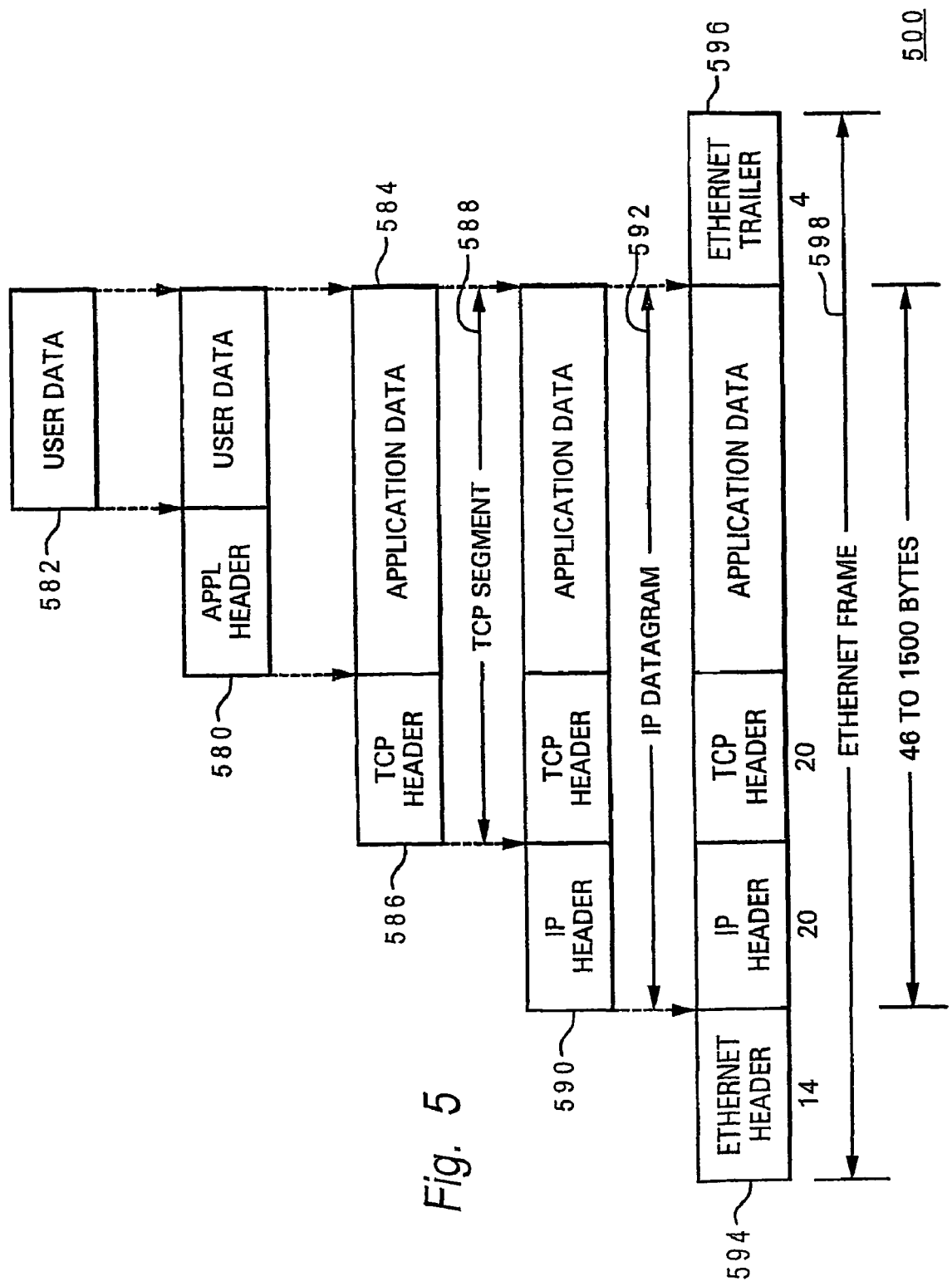
FIG. 5 shows the format of a data packet as it traverses the TCP/IP protocol stack, as may be utilized in a preferred embodiment of the present invention.

When an application sends data using TCP/IP, the data is sent down a protocol stack, through each layer, until it is sent out as a stream of bits across the network. As shown in FIG. 5, each layer in the protocol stack 500 adds information to the data by prepending headers (and sometimes adding trailer information) to the data that it receives. For instance, at the application layer an application header 580 is prepended to user data 582 to form application data 584. At the transport layer a transport protocol header is prepended to the application data. In the case of FIG. 5 the transport layer is TCP, and therefore a TCP header 586 is prepended to the application data 584, thereby forming a TCP frame 588 that is sent to the network layer IP. The TCP header 586 comprises twenty bytes. Similarly, at the network layer, a network layer header is prepended to the transport layer data. In the case of TCP/IP, an IP header 590 is prepended to the TCP frame 588 to form an IP datagram 592. The IP header 590 also comprises twenty bytes. Finally, at the link layer a media header such as Ethernet header 594 is added to the data received from the network layer to form a frame of data. In some instances, such as when the media is Ethernet, a media trailer is also appended to the end of the data. For instance, in FIG. 5 an Ethernet trailer 96 is appended to the Ethernet Header 594 and the IP datagram 592 to form an Ethernet frame 598. The Ethernet frame comprises the stream of bits that flow across the network that correspond to the original application message data. The numbers (14, 20, 20, 4) at the bottom of the headers are typical sizes of the headers in bytes, e.g., the Ethernet header 94 comprises 14 bytes, etc. The size of the frame will be limited by the maximum transmission unit (MTU) of the type of network being used to transfer the data packet. For example, the MTU of an Ethernet network is 1500 bytes. The network layer automatically performs fragmentation (breaking the datagram up into smaller pieces), so that each fragment is smaller than the MTU of the network.

With reference now back to FIGS. 1 and 4, the operation of a dynamic IP packet reassembly timer as provided in a preferred embodiment of the present invention for use in a heterogeneous network environment is now described. A receiving host in the network stores first and second user-configurable per-interface reassembly timers in its memory—the first set to an optimized reassembly timer for a fast network and the second set to an optimized reassembly timer for a slower network. In a preferred embodiment of the present invention, the first or second reassembly timer for discarding IP fragments is dynamically selected for each IP packet received. This embodiment provides substantial improvements in avoiding data corruption due to IP-ID wrap-around in IP network systems.

Upon receiving an IP fragment, the receiver determines whether the sender is on the same subnet as the receiver based on the source address 122, for example, or other network information. The receiver will utilize the faster (first stored) reassembly time in its reassembly timer for IP fragments received from a sender on the same subnet, and the slower (second stored) reassembly time in its reassembly timer for IP fragments coming through a gateway or other slower or longer link on the network.

In this way, a receiver that is connected to variable speed links in the network will set different reassembly timers based on the type or speed of the interface over which the IP fragment was received. For example, IP packets received from a sender on the same subnet would have a reassembly time set to a very short value (for example, half a second). IP fragments received through a gateway or over known longer links would be set to a longer reassembly timer (for example, one second to account for the slower speeds out across the network). The selected reassembly timer would normally be used by the receiver for all subsequently received data fragments belonging to the same data packet, if the received fragment was the first fragment of an IP packet or if the calculated reassembly timer is determined to be larger than the currently used timer in the receiving system. This algorithm for setting the reassembly time could be used on each fragment of an IP packet or only on the first fragment and then re-used on all subsequent fragments from the same data packet, depending on the granularity desired.

Figure 6:
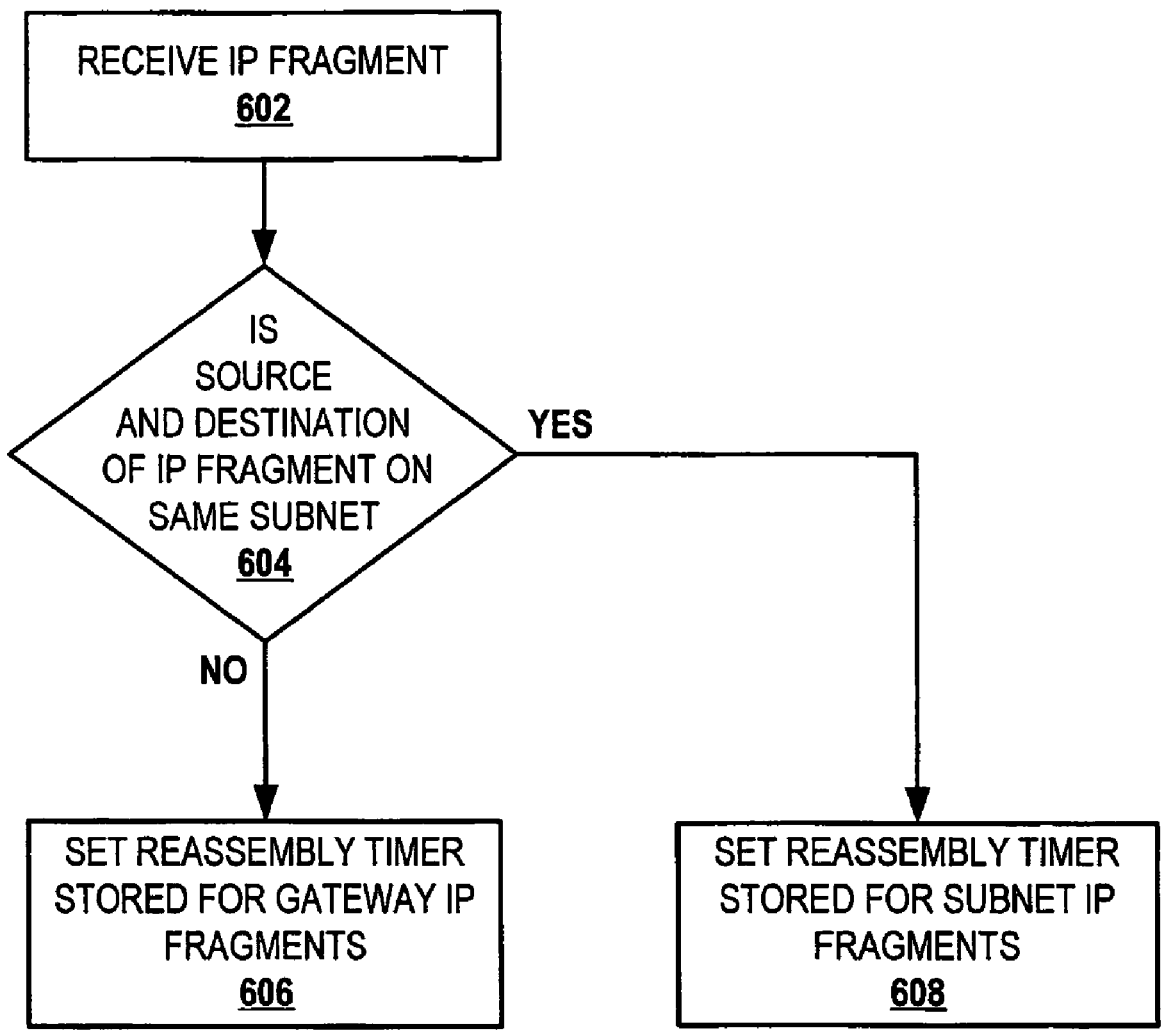
FIG. 6 shows is shown a flow diagram of a process for setting the reassembly timer in response to receiving an IP fragment, in accordance with a preferred embodiment of the present invention.
Figure 7:
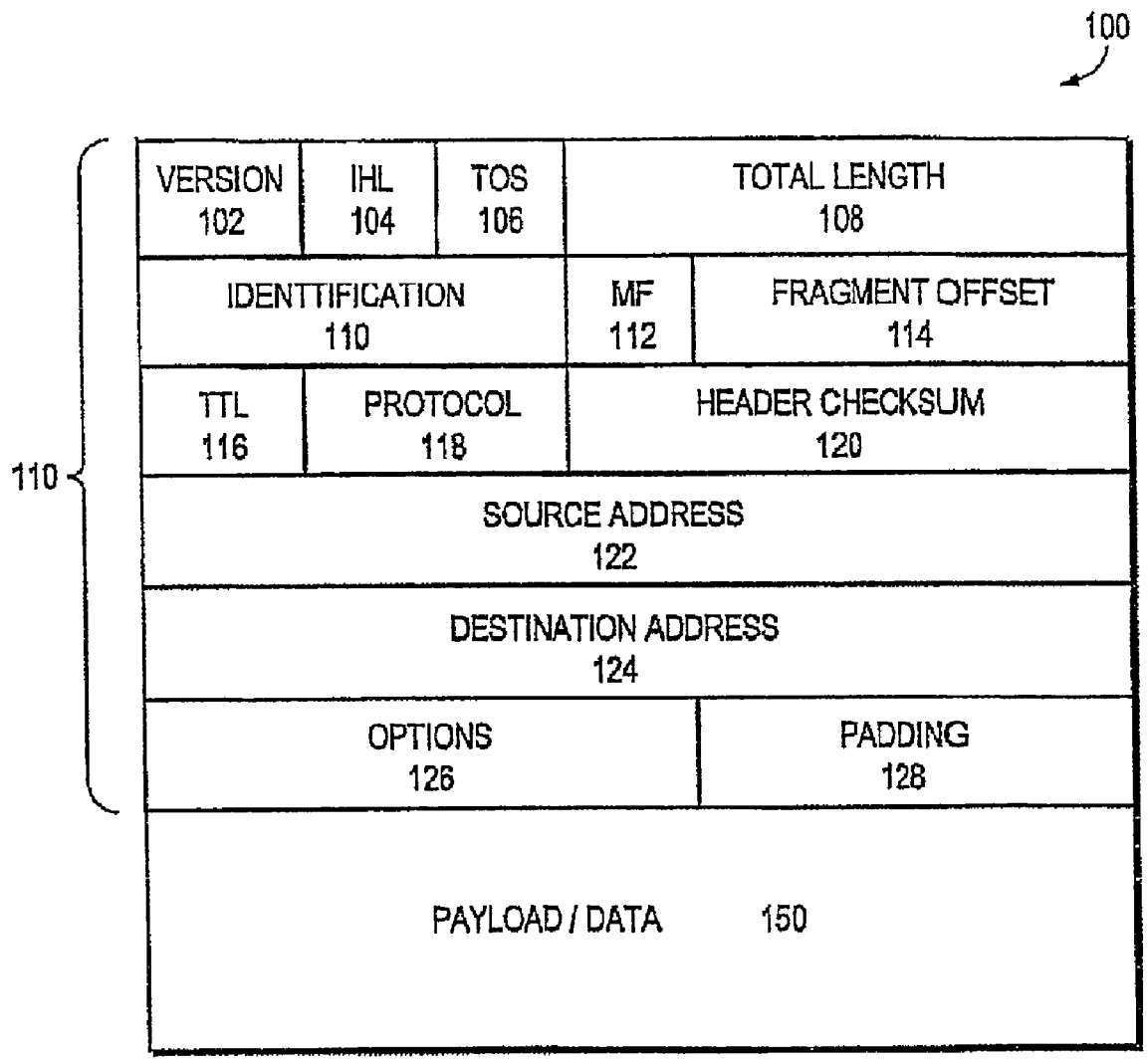
FIG. 7 is a schematic block diagram of an IP packet data format comprising an IP header portion and a payload/data portion.

With reference now to FIG. 6, there is shown a flow diagram of a process for setting the reassembly timer in response to receiving an IP fragment, in accordance with a preferred embodiment of the present invention. The process begins at step 602 when an IP fragment is received by a client on the network. The process proceeds to decision block 604, where the receiving client determines if the source and destination IP addresses of the IP fragment indicate that the sender and receiver are on the same subnet of the network. If so, the receiver sets the reassembly timer to a value stored at the receiver for IP fragments received on the same subnet as seen at block 606. This reassembly timer value would have been predetermined by the user or calculated by the system as an optimal time for discarding IP fragments and requiring retransmission over the subnet, based on the speed and configuration of that subnet. If the decision at block 604 is that the sender and receiver are not on the same subnet, the process proceeds to step 608, where the receiver sets the reassembly timer to a value stored in the receiver determined to be optimized for an IP fragment received over a gateway or other slower link within the network. This reassembly time will typically be longer than that set in step 606 to account for the longer latencies associated with the network outside the subnet.

As will be appreciated, this solution does not require and modifications on the sending side of the communication. Also, the per-interface reassembly timers are more granular than the current system-wide reassembly timer value. On UNIX-based systems, this solution can be easily implemented by enhancing the "ifconfig" command to provide the interface specific reassembly timer.

It will be appreciated by one of ordinary skill in the art that the method described above will typically be carried out in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

Accordingly, the present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

While the invention has been particularly shown and described with reference to a preferred embodiment, it will be understood by those skilled in the art that various changes in form and detail may be made therein without departing from the spirit and scope of the invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc., or by transmitting the code for remote execution. The method form of the invention may be practiced by combining one or more machine-readable storage devices containing the code according to the present invention with appropriate standard computer hardware to execute the code contained therein. An apparatus for practicing the invention could be one or more computers and storage systems containing or having network access to computer program(s) coded in accordance with the invention. While this invention is described in terms of the best mode for achieving this invention's objectives, it will be appreciated by those skilled in the art that variations may be accomplished in view of these teachings without deviating from the spirit or scope of the present invention.

What is claimed is:

1. In a data processing system network, a method comprising:
    receiving a data fragment from over a network at a receiver;
    determining if a sender of a data packet that includes the data fragment is in a same network subnet as the receiver;
    in response to determining that the sender of the data packet is connected to the same network subnet as the receiver, dynamically selecting a first reassembly time for the data fragment as a function of the speed of an interface between the sender of the data packet and the receiver;
    in response to determining that the sender of the data packet is not connected to the same network subnet as the receiver, dynamically selecting a second reassembly time for the data fragment as a function of the speed of the interface between the sender of the data packet and the receiver; and
    following receipt of the data fragment, discarding the data fragment if the data fragment remains fragmented from other fragments of the data packet at the receiver longer than (a) the first reassembly time when the sender and the receiver are in the same network subnet, or (b) the second reassembly time when the sender and the receiver are not in the same network subnet.

2. The method according to claim 1, wherein the first reassembly time is faster than the second reassembly time.

3. The method according to claim 1, further comprising storing the selected reassembly time, selected from among the first reassembly time and the second reassembly time, at the receiver.

4. The method according to claim 1, wherein the sender is connected to the receiver by a plurality of links, wherein any one of the plurality of links is a known fast link.

5. The method according to claim 1, wherein the sender of the data packet is connected to the receiver over the known fast link of the network when the sender is within the same network subnet of the network as the receiver.

6. The method according to claim 1, wherein the data packet is an IP packet generated by an IP layer.

7. A data processing system comprising:
    means for receiving a data fragment from over a network at a receiver of the data processing system;
    means for determining if a sender of a data packet that includes the data fragment is in a same network subnet as the receiver;
    means for in response to determining that the sender of the data packet is connected to the same network subnet as the receiver, dynamically selecting a first reassembly time for the data fragment as a function of the speed of an interface between the sender of the data packet and the receiver;
    means for in response to determining that the sender of the data packet is not connected to the same network subnet as the receiver, dynamically selecting a second reassembly time for the data fragment as a function of the speed of the interface between the sender of the data packet and the receiver; and
    means for assigning a time of receipt of a full complement of fragments that make up the data packet, wherein the time assigned is based on the speed of the connection between the sender and the receiver; and
    means for following receipt of the data fragment, discarding the data fragment if the data fragment remains fragmented from other fragments of the data packet at the receiver longer than (a) the first reassembly time when the sender and the receiver are in the same network subnet, or (b) the second reassembly time when the sender and the receiver are not in the same network subnet.

8. The system according to claim 7, wherein the first reassembly time is faster than the second reassembly time.

9. The system according to claim 7, further comprising means for storing the selected reassembly time, selected from among the first reassembly time and the second reassembly time, at the receiver.

10. The system according to claim 7, wherein the sender is connected to the receiver by a plurality of links, wherein any one of the plurality of links is a known fast link.

11. The system according to claim 7, wherein the sender of the data packet is connected to the receiver over the known fast link of the network when the sender is within the same network subnet of the network as the receiver.

12. The system according to claim 7, wherein the data packet is an IP packet generated by an IP layer.

13. An article of manufacture comprising machine-readable storage medium including program logic embedded therein that causes control circuitry in a data processing system to perform the steps of:

receiving a data fragment from over a network at the receiver;

determining if a sender of a data packet that includes the data fragment is in a same network subnet as the receiver;

in response to determining that the sender of the data packet is connected to the same network subnet as the receiver, dynamically selecting a first reassembly time for the data fragment as a function of the speed of an interface between the sender of the data packet and the receiver;

in response to determining that the sender of the data packet is not connected to the same network subnet as the receiver, dynamically selecting a second reassembly time for the data fragment as a function of the speed of the interface between the sender of the data packet and the receiver; and following receipt of the data fragment, discarding the data fragment if the data fragment remains fragmented from other fragments of the data packet at the receiver longer than (a) the first reassembly time when the sender and the receiver are in the same network subnet, or (b) the second reassembly time when the sender and the receiver are not in the same network subnet.

14. The article of manufacture according to claim 13, wherein the first reassembly time is faster than the second reassembly time.

15. The article of manufacture according to claim 13, further comprising storing the selected reassembly time, selected from among the first reassembly time and the second reassembly time, at the receiver.

16. The article of manufacture according to claim 13, wherein the sender is connected to the receiver by a plurality of links, wherein any one of the plurality of links is a known fast link.

17. The article of manufacture according to claim 13, wherein the sender of the data packet is connected to the receiver over the known fast link of the network when the sender is within the same network subnet of the network as the receiver of the data packet.

18. The article of manufacture according to claim 13, wherein the data packet is an IP packet generated by an IP layer.

* * * * *